United States Patent [19]

Tsenter

[11] Patent Number: 5,143,799
[45] Date of Patent: Sep. 1, 1992

[54] SEALED BATTERIES WITH ZINC ELECTRODE

[75] Inventor: Boris Tsenter, Jerusalem, Israel

[73] Assignee: Battery Technologies International, Ltd., Jerusalem, Israel

[21] Appl. No.: 822,816

[22] Filed: Jan. 21, 1992

[51] Int. Cl.⁵ .......................................... H01M 10/36
[52] U.S. Cl. ........................................ 429/9; 429/57; 429/206; 429/229; 429/254
[58] Field of Search ............... 429/57, 59, 101, 9, 429/219, 223, 229, 206, 254

[56] References Cited

U.S. PATENT DOCUMENTS

| | | | |
|---|---|---|---|
| 3,669,744 | 6/1972 | Tsenter et al. | 429/223 X |
| 4,004,068 | 1/1977 | Briggs et al. | 429/57 |
| 4,127,703 | 11/1978 | Holleck | 429/57 |
| 4,605,603 | 8/1986 | Kanda et al. | 429/59 |
| 4,621,034 | 11/1986 | Kanda et al. | 429/59 |

*Primary Examiner*—Anthony Skapars
*Attorney, Agent, or Firm*—Mark M. Friedman; Benjamin J. Barish

[57] ABSTRACT

A sealed rechargeable nickel-zinc or silver-zinc electrochemical cell including two compartments, one having a zinc electrode and a first hydrogen electrode and the other having a nickel or silver electrode and a second hydrogen electrode electrically connected to the first hydrogen electrode. The two compartments share a common gas space. During discharge the cell acts as a conventional nickel-zinc or silver-zinc electrochemical cell. During charging the gases evolved are immediately internally consumed, allowing the entire cell to be sealed. Furthermore, when the cell is fully charged there is a noticeable voltage jump which serves as a clear indication that the cell is fully charged and helps prevent overcharging and its detrimental effects.

15 Claims, 1 Drawing Sheet

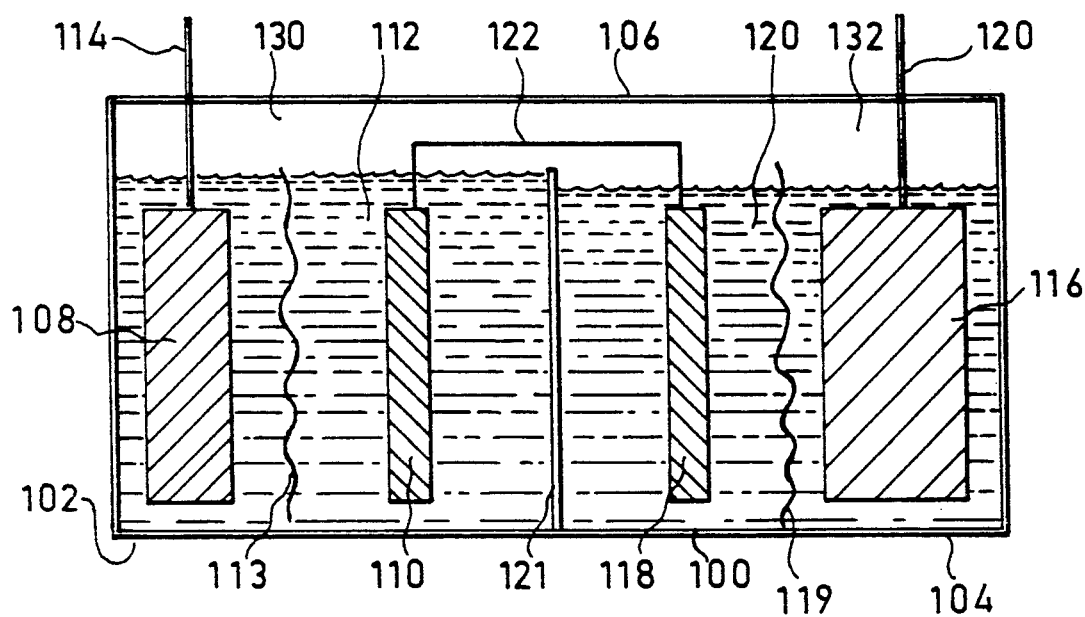

SEALED BATTERIES WITH ZINC ELECTRODE

FIELD AND BACKGROUND OF THE INVENTION

The present invention relates to a sealed rechargeable battery having a zinc electrode and, more particularly, to a configuration of a battery having one zinc electrode and another electrode of, for example, nickel or silver, which is rechargeable and which is sealed.

Zinc-nickel and zinc-silver batteries possess certain desirable qualities. Chief among these is their high energy density, or high energy output per unit weight or volume, which is roughly three to five times higher than that of a lead-acid or nickel-cadmium battery.

Since zinc-nickel and zinc-silver batteries are normally more expensive than the comparable lead-acid battery, it is highly desirable to use these zinc batteries as a secondary battery with alternating discharging and charging cycles.

However, for a number of reasons nickel-zinc and silver-zinc batteries perform inadequately as a secondary cell, and suffer from a limited cycle life. One of the reasons for this is related to the fact that presently known nickel-zinc and silver-zinc batteries are unsealed, that is, open to the atmosphere. The batteries are unsealed in order to better manage the production and consumption of gases during cell charging. The problem is made more severe by the presence of a cellophane separator between the electrodes whose small pore structure size makes it difficult if not impossible for the oxygen cycle to take place.

Contact with the atmosphere can lead to the carbonization of the electrolyte through reaction of the potassium hydroxide electrolyte with carbon dioxide in the air according to the reaction:

$$CO_2 + 2\ KOH \rightarrow K_2CO_3 + H_2O \tag{1}$$

Operating a conventional zinc battery in a cycling mode has a number of other highly unpleasant consequences. For example, it is relatively difficult to accurately determine when the cell has been fully charged. This uncertainty can lead to undercharging which, in turn, increases cycle frequency and operational inconvenience. Alternatively, the uncertainty as to the end point of charging can lead to overcharging.

Overcharging can have a number of serious detrimental consequences. First, the release of oxygen at the nickel or silver electrode and of hydrogen at the zinc electrode can bring about the deterioration of the electrolyte during overcharging when oxygen is evolved at the positive electrode and hydrogen is evolved at the negative electrode (See reactions (5) and (6) below). The net effect is to eliminate water (see reaction (7) below) which tends to concentrate the electrolyte.

Second, overcharging increases the possibility of the irreversible formation of dendrites, which consist of low zinc ion regions, which tend to short-circuit the cell and destroy its effectiveness.

For these and other reasons, there is thus a widely recognized need for a sealed rechargeable nickel-zinc or nickel-silver cell which can be charged optimally without overcharging or undercharging and which will not deteriorate rapidly during use.

It would be desirable to have a rechargeable zinc battery which can be sealed by the manufacturer so as to eliminate all contact with the atmosphere and thereby reduce the attendant deleterious effects of such contact. There is also a clear need for, and it would be highly advantageous to have, a sealed rechargeable zinc battery which could be fully charged without fear of overcharging and the adverse consequences of such overcharging.

SUMMARY OF THE INVENTION

According to the present invention there is provided an electrochemical cell, comprising: a first sealed compartment containing a first electrolyte and a first gas space; a second sealed compartment containing a second electrolyte and a second gas space, the second gas space being in communication with the first gas space; a first electrode immersed in the first electrolyte; a second electrode immersed in the second electrolyte; a first hydrogen electrode immersed in the first electrolyte; and a second hydrogen electrode immersed in the second electrolyte and electrically connected to the first hydrogen electrode.

According to further features in preferred embodiments of the invention described below, the first electrode of the cell is preferably a zinc electrode and the second electrode is preferably either a silver or a nickel electrode.

In accordance with the present invention it is possible to create a sealed rechargeable nickel-zinc and silver-zinc cell which will have a long service life and which will deteriorate to a much lesser extent than comparable cells heretofore known.

A cell according to the present invention differs from the configuration of a conventional nickel-zinc of silver-zinc cell in that the cell is split into two compartments. Each of the two compartments features a hydrogen electrode which is electrically connected to the other hydrogen electrode.

One of the compartments, in addition to the hydrogen electrode, has a zinc electrode, which can be electrically connected to an electrical load or to a charging source external to the cell. Furthermore, it is possible to electrically connect the nickel or silver electrode to another nickel-zinc or silver-zinc cell so as to operate several cells in series. It is also possible to electrically connect the zinc electrode to another nickel-zinc cell so as to operate the several cells in series. The other compartment, in addition to the hydrogen electrode, has a nickel or a silver electrode which can also be electrically connected to an electrical load or to a charging source external to the cell. The gas space in each compartment is in communication with the gas space in the other compartment. Moreover, it may be desirable to place in one compartment a battery of zinc-hydrogen cells and in the other compartment, which shares the same gas space as the first compartment, a battery of nickel-hydrogen cells and to connect together the last hydrogen electrodes of both batteries.

The entire cell can most easily be configured as a single sealed external housing. The housing is divided into two compartments by a barrier which extends in such a way as to prevent electrolyte from one compartment from contacting and intermixing with electrolyte from the other compartment, but which does not prevent the free communication of the gas spaces in each compartment, in effect, allowing for a common gas space.

According to the present invention, a conventional nickel-zinc cell is split into two cells which are connected in series—a nickel-hydrogen cell and a hydrogen-zinc cell. Similarly, a conventional silver-zinc cell is split into two cells which are connected in series—a silver-hydrogen cell and a hydrogen-zinc cell.

The effect of this compartmentalization is to eliminate the need to contact the atmosphere, allowing a cell according to the present invention to be permanently sealed. In addition, the compartmentalization provides an accurate indication of when the cell has been recharged, as is explained below, thereby greatly reducing the risk of overcharging the cell and causing damage which would tend to reduce the service life of the cell.

The present invention thus successfully addresses the shortcomings of the presently known configurations by providing a rechargeable zinc battery which is sealed thereby eliminating the adverse consequences brought on through contact with the atmosphere. In addition, a cell according to the present invention offers a long service life through repeated discharge and recharge cycles by greatly reducing the danger of overcharging.

BRIEF DESCRIPTION OF THE DRAWINGS

The invention is herein described, by way of example only, with reference to the accompanying drawing, wherein:

FIG. 1 is a schematic depiction of an embodiment of a nickel-zinc or a silver-zinc electrochemical cell according to the present invention.

DESCRIPTION OF THE PREFERRED EMBODIMENTS

The present invention is of a nickel-zinc or silver-zinc cell which can be sealed and which has a long service life. Specifically, the cell according to the present invention has properties which make it practical to seal the cell from the atmosphere and which makes its operation easier by providing clear indication of when the cell is fully charged.

The present invention is directed toward the elimination of certain shortcomings of existing type of nickel-zinc or silver-zinc batteries as described above.

The principles and workings of a cell according to the present invention can be better understood with reference to the drawing and the accompanying detailed description which describe one possible embodiment of a cell according to the present invention.

Referring now to the drawing, FIG. 1 is a schematic depiction of a cell 100 according to the present invention. Cell 100 shown in FIG. 1 may be either a nickel-zinc or a silver-zinc cell. Both types of cells will be described below.

Cell 100 is divided into two compartments, each of which is itself a cell. One of the compartments is a zinc-hydrogen cell 102 while the other compartment is a nickel-or silver-hydrogen cell 104. Each of cells 102 and 104, is enclosed in housing 106 which completely seals cells 102 and 104 and prevents contact with the atmosphere.

Zinc-hydrogen cell 102 includes a zinc electrode 108 and a first hydrogen electrode 110 which are at least partially immersed in a first electrolyte 112. First electrolyte 112 near zinc electrode 108 is separated from first electrolyte 112 located near first hydrogen electrode 110 by a first separator 113. First electrolyte 112 only partially fills zinc-hydrogen cell 102 leaving a first gas space 130 above first electrolyte 112. Zinc electrode 108 is electrically connected to a zinc electrode lead 114 which serves to alternately connect zinc electrode 108 to an electric load (not shown) on which cell 100 can do work, or to an external voltage source (not shown) which can be used for charging cell 100.

Nickel-hydrogen or silver-hydrogen cell 104 includes a nickel or silver electrode 116 and a second hydrogen electrode 118 which are at least partially immersed in a second electrolyte 120. Second electrolyte 120 near nickel or silver electrode 116 is separated from second electrolyte 120 located near second hydrogen electrode 118 by a second separator 119. Second electrolyte 120 is kept completely separate from first electrolyte 112 by a barrier 121. Second electrolyte 120 only partially fills nickel-or silver-hydrogen cell 104 leaving a second gas space 132 above second electrolyte 120. First gas space 130 and second gas space 132 are in communication with each other allowing gases from each cell 102 and 104 to pass back and forth. In effect, first gas space 130 and second gas space 132 form a single common gas space.

For simplicity of presentation, FIG. 1 and the description above and below depicts the various electrodes as being immersed in pools of liquid electrolytes. It should be kept in mind that in reality, only small amounts of electrolytes are used, making contact only with the small pores of the electrodes and the separators. Thus, in a practical system, only a small portion of the compartments would be occupied with electrolytes while most of the rest of the space would constitute the gas space.

Nickel or silver electrode 116 is electrically connected to a nickel or silver electrode lead 120 which serves to alternately connect nickel or silver electrode 116 to an electric load (not shown) on which cell 100 can do work, or to an external voltage source (not shown) or to another cell configured in series with the present cell, which can be used for charging cell 100. First hydrogen electrode 110 is electrically connected to second hydrogen electrode 118 through hydrogen electrode lead 122. Cells 102 and 104 are thus electrically connected to each other in series.

The principles of operation of a cell according to the present invention may be understood with reference to the operation of a conventional, single compartment, nickel zinc cell.

When a conventional nickel-zinc cell is being discharged, the following reactions take place: At the nickel electrode:

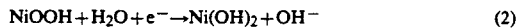

$$NiOOH + H_2O + e^- \rightarrow Ni(OH)_2 + OH^- \qquad (2)$$

At the zinc electrode:

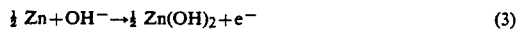

$$\tfrac{1}{2} Zn + OH^- \rightarrow \tfrac{1}{2} Zn(OH)_2 + e^- \qquad (3)$$

The sum of reactions (2) and (3) is:

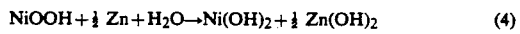

$$NiOOH + \tfrac{1}{2} Zn + H_2O \rightarrow Ni(OH)_2 + \tfrac{1}{2} Zn(OH)_2 \qquad (4)$$

When a conventional nickel-zinc cell is being charge the reactions shown in equations (2)–(4) above are reversed and take place from right to left.

The following reactions take place during overcharging, i.e., when charging continues past the point when the cell is fully charged: At the nickel electrode:

$$OH^- \rightarrow \tfrac{1}{2} H_2O + \tfrac{1}{4} O_2 + e^- \qquad (5)$$

At the zinc electrode:

$$H_2O + e^- \rightarrow OH^- + \tfrac{1}{2} H_2 \quad (6)$$

The sum of reactions (5) and (6) is:

$$H_2O \rightarrow H_2 + \tfrac{1}{2} O_2 \quad (7)$$

It is to be noted that during overcharging both hydrogen and oxygen gases are evolved. This leads to damage to the cellophane which normally separates the zinc and nickel electrodes from each other. Furthermore, during overcharging conditions are ripe for the formation of dendrites, or finger-like zones of low zinc ion concentration, which reach from the zinc electrode to the nickel electrode, effectively and irreversibly short-circuiting the cell and bringing about its premature demise.

These difficulties are overcome by using a cell having a configuration according to the present invention. The operation of such a cell can be appreciated with reference to the various reactions which take place during the cell operation.

During discharge of a nickel-zinc cell according to the present invention the following reactions take place in the nickel-hydrogen compartment:
At the nickel electrode:

$$NiOOH + H_2O + e^- \rightarrow Ni(OH)_2 + OH^- \quad (8)$$

At the hydrogen electrode of the nickel-hydrogen cell:

$$\tfrac{1}{2} H_2 + OH^- \rightarrow H_2O + e^- \quad (9)$$

The summary reaction of the nickel-hydrogen cell discharge is obtained by adding equations (8) and (9):

$$NiOOH + \tfrac{1}{2} H_2 \rightarrow Ni(OH)_2 \quad (10)$$

Also during discharge of a nickel-zinc cell according to the present invention the following reactions take place in the zinc-hydrogen compartment:
At the hydrogen electrode of the zinc-hydrogen cell:

$$H_2O + e^- \rightarrow \tfrac{1}{2} H_2 + OH^- \quad (11)$$

At the zinc electrode:

$$\tfrac{1}{2} Zn + OH^- \rightarrow \tfrac{1}{2} Zn(OH)_2 + e^- \quad (12)$$

The summary reaction of the zinc-hydrogen cell discharge is obtained by adding equations (11) and (12):

$$\tfrac{1}{2} Zn + H_2O \rightarrow \tfrac{1}{2} Zn(OH)_2 + \tfrac{1}{2} H_2 \quad (13)$$

The overall summary reaction of the entire two-compartment cell, including both the zinc-hydrogen and nickel-hydrogen cells is the sum of reactions (10) and (13):

$$NiOOH + \tfrac{1}{2} Zn + H_2O \rightarrow Ni(OH)_2 \tfrac{1}{2} Zn(OH)_2 \quad (14)$$

The overall reaction of a nickel-zinc cell according to the present invention shown in equation (14) is seen to be identical with the overall equation of a conventional nickel-zinc cell shown in equation (4).

Similarly, the equations for a silver-zinc cell according to the present invention can be summarized as follows.

During discharge of a silver-zinc cell according to the present invention the following reactions take place in the silver-hydrogen compartment:
At the silver electrode:

$$\tfrac{1}{2} AgO + \tfrac{1}{2} H_2O + e^- \rightarrow \tfrac{1}{2} Ag + OH^- \quad (15)$$

At the hydrogen electrode of the silver-hydrogen cell:

$$\tfrac{1}{2} H_2 + OH^- \rightarrow H_2O + e^- \quad (16)$$

The summary reaction of the silver-hydrogen cell discharge is obtained by adding equations (15) and (16):

$$\tfrac{1}{2} AgO + \tfrac{1}{2} H_2 \rightarrow \tfrac{1}{2} Ag + \tfrac{1}{2} H_2O \quad (17)$$

Also during discharge of a silver-zinc cell according to the present invention the following reactions take place in the zinc-hydrogen compartment:
At the hydrogen electrode of the zinc-hydrogen cell:

$$H_2O + e^- \rightarrow \tfrac{1}{2} H_2 + OH^- \quad (18)$$

At the zinc electrode:

$$\tfrac{1}{2} Zn + OH^- \rightarrow \tfrac{1}{2} Zn(OH)_2 + e^- \quad (19)$$

The summary reaction of the zinc-hydrogen cell discharge is obtained by adding equations (18) and (19):

$$\tfrac{1}{2} Zn + H_2O \rightarrow \tfrac{1}{2} Zn(OH)_2 + \tfrac{1}{2} H_2 \quad (20)$$

Equations (18)–(20) are identical with equations (11)–(13) used above for the zinc-hydrogen of a nickel-zinc electrode. The overall summary reaction of the entire two-compartment silver-zinc cell, including both the zinc-hydrogen and silver-hydrogen cells is the sum of reactions (17) and (20):

$$AgO + Zn + H_2O \rightarrow Ag + Zn(OH)_2 \quad (21)$$

The overall reaction of a silver-zinc cell according to the present invention shown in equation (21) is identical with the overall reaction of a conventional silver-zinc cell.

When either a nickel-zinc or a silver-zinc cell according to the present invention is overcharged, the following reactions take place:
At the nickel or silver electrode:

$$OH^- \rightarrow \tfrac{1}{2} O_2 + \tfrac{1}{2} H_2O + e^- \quad (22)$$

At the hydrogen electrode of the nickel-hydrogen or silver-hydrogen cell:

$$\tfrac{1}{4} O_2 + \tfrac{1}{2} H_2O + e^- \rightarrow OH^- \quad (23)$$

At the zinc electrode:

$$H_2O + e^- \rightarrow OH^- + \tfrac{1}{2} H_2 \quad (24)$$

At the hydrogen electrode of the zinc-hydrogen cell:

$$OH^- + \tfrac{1}{2} H_2 \rightarrow H_2O + e^- \quad (25)$$

It is seen that during overcharge oxygen is evolved at the nickel or silver electrode while hydrogen is evolved at the zinc electrode. However, in contrast with a conventional nickel-zinc or silver-zinc cell, the produced oxygen is immediately consumed at the hydrogen electrode of the nickel-hydrogen or silver-hydrogen cell and the produced hydrogen is immediately consumed at the hydrogen electrode of the zinc-hydrogen cell. The conditions for the adsorption and consumption of the evolved oxygen and hydrogen are ideal since the various physical and chemical processes take place on a gas electrode with favorable mass transfer conditions.

Furthermore, some of the hydrogen released at the zinc electrode is consumed at the hydrogen electrode of the nickel-hydrogen or silver-hydrogen cell by a direct chemical, rather than electrochemical, reaction of hydrogen with oxygen to form water:

$$H_2 + \tfrac{1}{2} O_2 \rightarrow H_2O \tag{26}$$

The occurrence of this reaction leads to a decrease in the flow of hydrogen to the hydrogen electrode of zinc-hydrogen cell. The decrease, in turn, results in a sudden increase, or jump, of the potential of the hydrogen electrode of zinc-hydrogen cell. This results in a jump in voltage of the zinc-hydrogen cell and of the overall nickel-zinc or silver-zinc cell.

The overall voltage jump can be profitably used as an indicator of the end of charging. During charging the voltage drop across the cell is continuously monitored. As soon as the cell is fully charged there is a noticeably voltage jump across the cell. As soon as such a jump is perceived the charging should be stopped thereby preventing overcharging and the attendant deleterious effects as described above.

Thus a cell according to the present invention offers a solution to the problem of overcharging a nickel-hydrogen and silver-hydrogen batteries, because oxygen is consumed on the hydrogen electrode of the nickel-hydrogen cell and at the same time, a jump in voltage takes place on the zinc-hydrogen cell, which indicates that it is necessary to stop the charge.

The voltage of the two cells connected in series, is the sum of the voltages of each cell, the zinc-hydrogen and nickel-hydrogen or silver-hydrogen cells. The voltage of a nickel-hydrogen cell is made up of an electromotive force (e.m.f.) of 1.34 V, voltage drops at the hydrogen electrode and at the nickel electrode, and ohmic resistance. During discharge, the average voltage of a nickel-hydrogen cell is approximately 1.25 V.

The voltage of a zinc-hydrogen cell is made up of an electromotive force (e.m.f.) of 0.42 V, voltage drops at the hydrogen electrode and at the zinc electrode, and ohmic resistance. During discharge, the average voltage of a zinc-hydrogen cell is approximately 0.20 V.

Thus the voltage of the overall nickel-zinc system according to the present invention is 1.45 V during current discharge.

During overdischarge of a nickel-zinc cell according to the present invention, the following reactions take place. On the nickel electrode hydrogen evolves and is ionized on hydrogen electrode of the nickel-hydrogen cell. This is known as a "closed hydrogen cycle" and is described in Tsenter U.S. Pat. No. 3,669,744, which is herein fully incorporated by reference as if fully set forth herein.

During overdischarge oxygen is evolved on the zinc electrode and is ionized on the hydrogen electrode of the zinc-hydrogen cell, to effect a closed oxygen cycle. Thus, a closed oxygen cycle is effected whereby the rate of oxygen evolution on the zinc electrode equal the rate of oxygen ionization on the hydrogen electrode, resulting in the stabilization of the pressure in the cell.

Any suitable electrolyte may be used in the two cells making up the overall cell according to the present invention. Preferably, the electrolyte will be aqueous potassium hydroxide. Potassium hydroxide may be used as the electrolyte in both compartments.

The aqueous electrolyte used in the nickel-hydrogen or silver-hydrogen cell is preferably made up of a mixture of from about 20 to about 40% potassium alkaline, preferably about 30% potassium hydroxide, and from about 0.5 to about 2.5%, preferably about 2.5% lithium alkaline. The electrolyte solution used in the zinc-hydrogen cell is preferably made up of from about 20 to about 40% potassium alkaline, preferably about 40% potassium hydroxide, saturated with zinc ions.

The ability to use two somewhat different electrolytes is an additional advantage of a cell according to the present invention. This is because the nickel electrode operates more efficiently in an electrolyte not containing zinc ions. Splitting the overall cell into two compartments allows the use of zinc ion-saturated electrolyte solution in the zinc-hydrogen compartment and a zinc ion-free electrolyte solution in the nickel-hydrogen or silver-hydrogen compartment.

The separators in the two cells can be made of any suitable material. Preferably, cellophane, non-woven polypropylene or an ion-exchange membrane is used as a separator for the zinc-hydrogen cell and asbestos or non-woven polypropylene is used as a separator for the nickel-hydrogen cell. In the silver-hydrogen cell the separator is preferably made from cellophane in combination with asbestos or non-woven polypropylene.

A cell according to present invention features optimal operating conditions in each of its two compartments. Thus, oxygen evolves only in nickel-hydrogen cell and is thus prevented from reacting with and deteriorating the cellophane separator of the zinc-hydrogen cell.

A nickel-zinc or silver-zinc battery according to the present invention thus is seen to have great advantages over existing nickel-zinc or silver-zinc batteries. The advantages can be summarized as follows:

First, a cell according to the present invention features a fully sealed construction.

Second, a cell according to the present invention offers an indication of the onset of overcharging thereby facilitating the prevention of overcharging and its deleterious effects.

Third, a cell according to the present invention allows each of its subcells to operate with an optimal electrolyte solution.

Further, a cell according to the present invention evolved no oxygen during overcharging of the nickel or silver electrodes, which oxygen, were it to evolve, would oxidize and therefore irreversibly damage, the separator in the zinc-hydrogen cell. Rather, the oxygen is immediately ionized on the hydrogen electrode of the nickel-hydrogen or silver-hydrogen cell.

Of course, using a cell made up of two cells increases somewhat the energy dissipated during charging and discharging of the cell. However, it is possible to prepare very active electrodes which feature considerably reduced energy dissipation. For illustrative purposes only, without in any way limiting the scope of the present invention, typical electrodes which might be used in conjunction with a cell according to the present invention are described below in more detail.

The zinc electrode is preferably prepared from pressed zinc powder and 1.5% mercury oxide, serving as an inhibitor of corrosion, on a copper grid. The electrode thickness is about 2.00 mm.

The hydrogen electrode preferably has a thickness of about 0.2 mm and is preferably made by pressing a mixture of about 75% carbon, about 5% acetylene soot, about 15% PTFE and about 0.1% Pt. The function of the PTFE is two-fold. It is simultaneously a binding component and a hydrophobic element. The carbon is primarily structural but also serves as an electrical conductor. The acetylene soot is added to improve the electrical conductivity. Platinum serves as a catalyst for both the charging and discharging processes.

The nickel electrode preferably has a thickness of about 4.0 mm and is preferably sintered. This electrode is made by means of the chemical $Ni(OH)_2$ impregnated into the nickel matrix.

The two cells making up a cell according to the present invention are preferably housed in a rigid housing, preferably made of a polymeric material, most preferably a polyamide vessel, divided into two compartments. The first compartment contains a zinc-hydrogen cell and the second compartment contains a nickel-hydrogen or silver-hydrogen cell. The zinc and nickel or silver electrodes are connected to externals terminals while the two hydrogen electrodes of the two cells are connected to each other inside the housing prior to hermetically sealing the housing.

While the invention has been described with respect to a single preferred embodiment, it will be appreciated that many variations, modifications and other applications of the invention may be made.

What is claimed is:

1. An electrochemical cell, comprising:
   (a) a first sealed compartment containing a first electrolyte and a first gas space;
   (b) a second sealed compartment containing a second electrolyte and a second gas space, said second gas space being in communication with said first gas space;
   (c) a first electrode in contact with said first electrolyte;
   (d) a second electrode in contact with said second electrolyte;
   (e) a first hydrogen electrode in contact with said first electrolyte; and
   (f) a second hydrogen electrode in contact with said second electrolyte and electrically connected to said first hydrogen electrode.

2. A cell as in claim 1 further comprising:
   (i) a first separator separating said first electrode and said first hydrogen electrode; and
   (ii) a second separator separating said second electrode and said second hydrogen electrode.

3. A cell as in claim 1 wherein said first electrode is a zinc electrode.

4. A cell as in claim 1 wherein said second electrode is a nickel electrode.

5. A cell as in claim 1 wherein said second electrode is a silver electrode.

6. A cell as in claim 2 wherein said first separator is cellophane, non-woven polypropylene or ion-exchange membrane.

7. A cell as in claim 6 wherein said first separator is cellophane.

8. A cell as in claim 4 wherein said second separator is asbestos or non-woven polypropylene.

9. A cell as in claim 8 wherein said second separator is asbestos.

10. A cell as in claim 5 wherein said second separator includes cellophane.

11. A cell as in claim 10 wherein said second separator further includes non-woven polypropylene or ion-exchange membrane.

12. A cell as in claim 1 wherein said first electrolyte includes from about 20 to about 40 percent potassium hydroxide.

13. A cell as in claim 1 wherein said second electrolyte includes from about 20 to about 40 percent potassium alkaline.

14. A cell as in claim 13 wherein said potassium alkaline is potassium hydroxide.

15. A cell as in claim 13 wherein said second electrolyte further includes from about 0.5 to about 2.5 percent lithium alkaline.

* * * * *